US012234875B2

(12) United States Patent
Gädke et al.

(10) Patent No.: US 12,234,875 B2
(45) Date of Patent: Feb. 25, 2025

(54) SPREADER UNIT FOR A MOTOR VEHICLE DRUM BRAKE

(71) Applicant: Continental Teves AG & Co. OHG, Frankfurt am Main (DE)

(72) Inventors: Martin Gädke, Hofheim (DE); Holger von Hayn, Bad Vilbel (DE); Matthias Schulitz, Frankfurt am Main (DE); Ahmed Sefo, Frankfurt am Main (DE); Uwe Bach, Niedernhausen (DE); Adrian Messner, Mainz (DE); Wolfgang Ritter, Oberursel (DE); Jens Hoffmann, Darmstadt (DE); Christian Vey, Frankfurt am Main (DE)

(73) Assignee: Continental Automotive Technologies GmbH, Hannover (DE)

( * ) Notice: Subject to any disclaimer, the term of this patent is extended or adjusted under 35 U.S.C. 154(b) by 554 days.

(21) Appl. No.: 17/616,742

(22) PCT Filed: May 27, 2020

(86) PCT No.: PCT/EP2020/064683
§ 371 (c)(1),
(2) Date: Dec. 6, 2021

(87) PCT Pub. No.: WO2020/244991
PCT Pub. Date: Dec. 10, 2020

(65) Prior Publication Data
US 2022/0333657 A1    Oct. 20, 2022

(30) Foreign Application Priority Data

Jun. 5, 2019 (DE) .................... 10 2019 208 223.8

(51) Int. Cl.
*F16D 65/22* (2006.01)
*B60T 1/06* (2006.01)
(Continued)

(52) U.S. Cl.
CPC ............. *F16D 65/22* (2013.01); *B60T 1/067* (2013.01); *F16D 51/20* (2013.01); *F16D 65/566* (2013.01);
(Continued)

(58) Field of Classification Search
CPC .......... B60T 1/067; F16D 51/20; F16D 65/22; F16D 65/562; F16D 65/566; F16D 67/02;
(Continued)

(56) References Cited

U.S. PATENT DOCUMENTS

| 4,804,072 A | 2/1989 | Michoux |
| 4,938,320 A * | 7/1990 | Hyde .................... F16D 65/563 |
| | | 192/111.16 |

(Continued)

FOREIGN PATENT DOCUMENTS

| CN | 201982549 | 9/2011 |
| CN | 105190076 A | 12/2015 |

(Continued)

OTHER PUBLICATIONS

Search Report dated Feb. 5, 2020 from corresponding German patent application No. DE 10 2019 208 223.8.

(Continued)

Primary Examiner — Robert A. Siconolfi
Assistant Examiner — San M Aung

(57) ABSTRACT

A spreader unit for a drum brake is provided with a readjustment device which ensures that the clearance remains substantially constant even in the case of wear on the brake linings. The readjustment device is arranged between actuating pistons and changes the spacing of the actuating pistons in at least one readjustment step when an actuating travel of the first and second brake shoe holders has exceeded a travel setpoint value. A thermally actuable blocking device mechanically prevents the execution of the read- (Continued)

justment step by the readjustment device at a temperature above a temperature setpoint value.

16 Claims, 4 Drawing Sheets

(51) Int. Cl.
  *F16D 51/20* (2006.01)
  *F16D 65/56* (2006.01)
  *F16D 67/02* (2006.01)
  *F16D 121/24* (2012.01)
  *F16D 125/36* (2012.01)
  *F16D 125/40* (2012.01)

(52) U.S. Cl.
  CPC .......... *F16D 67/02* (2013.01); *F16D 2121/24* (2013.01); *F16D 2125/36* (2013.01); *F16D 2125/40* (2013.01); *F16D 2200/0004* (2013.01)

(58) Field of Classification Search
  CPC ......... F16D 2200/0004; F16D 2121/24; F16D 2125/36; F16D 2125/40
  USPC ........................................................ 188/327
  See application file for complete search history.

(56) References Cited

U.S. PATENT DOCUMENTS

| | | | | |
|---|---|---|---|---|
| 5,150,773 | A | * | 9/1992 | Hickey .................. F16D 65/22 188/196 R |
| 6,345,702 | B1 | | 2/2002 | Tessitore |
| 2017/0363164 | A1 | | 12/2017 | Bach et al. |
| 2021/0190159 | A1 | * | 6/2021 | Bach ....................... F16D 65/56 |

FOREIGN PATENT DOCUMENTS

| | | | | |
|---|---|---|---|---|
| CN | 208331045 | | 1/2019 | |
| DE | 19858745 | A1 | 6/2000 | |
| DE | 102009036222 | A1 | 2/2011 | |
| DE | 102014226268 | A1 | 6/2016 | |
| DE | 102014226270 | A1 | 6/2016 | |
| DE | 102017218219 | A1 | 4/2019 | |
| DE | 102018216488 | A1 | 3/2020 | |
| EP | 0575825 | A1 | 12/1993 | |
| GB | 2151319 | A * | 7/1985 | ........... F16D 65/563 |
| JP | H08105471 | A | 4/1996 | |
| WO | 2015082205 | A2 | 6/2015 | |
| WO | 2019072768 | A1 | 4/2019 | |

OTHER PUBLICATIONS

International Search Report and Written Opinion dated Oct. 30, 2020 from corresponding International Patent application No. PCT/EP2020/064683.

Office Action dated Dec. 23, 2023; of the counterpart Chinese Application No. 202080035230.5.

Chinese First Office Action dated Mar. 23, 2023 for the counterpart Chinese Patent Application No. 202080035230.5 and DeepL Translation of same.

* cited by examiner

SPREADER UNIT FOR A MOTOR VEHICLE DRUM BRAKE

CROSS REFERENCE TO RELATED APPLICATIONS

This U.S. patent application claims the benefit of PCT patent application No. PCT/EP2020/064683, filed May 27, 2020, which claims the benefit of German patent application No. 10 2019 208 223.8, filed Jun. 5, 2019, both of which are hereby incorporated by reference.

TECHNICAL FIELD

The invention relates to an electromechanically drivable, spreader unit for a drum brake of a motor vehicle.

BACKGROUND an electromechanically drivable, spreader unit for a drum brake of a motor vehicle comprises a housing and first and second brake shoe holders that are arranged in a manner secured against rotation in relation to the housing. The brake shoe holders are able to be actuated linearly along an axis, respectively away from one another in a spreading direction and respectively toward one another in a release direction. Each act on a first and a second brake shoe provided respectively with a brake lining. The linear movement of the brake shoe holders is generated by one or more rotation-translation converter mechanisms. A readjustment device for compensating for an actuating travel that increases as a result of wear on the brake linings is arranged between the actuating pistons, said readjustment device being designed such that it changes the spacing of the actuating pistons in at least one readjustment step when the actuating travel has exceeded a setpoint value.

A spreader unit is described in the German laid-open application DE 10 2017 218 219 A1. The readjustment device has the objective of compensating for the wear on the brake linings such that the spacing between the lining and the brake drum, the clearance, remains substantially the same regardless of the state of wear on the lining, such that the spreader unit always has to execute the same actuating travel to actuate the brake.

In the event of prolonged braking, for example on a downhill section, significant heating of the brake occurs, wherein the brake drum expands such that, for the purpose of automatic travel compensation or for the purpose of maintaining the braking effect, the spreader unit has to carry out a longer actuating travel than in the cold (contracted) drum state. This compensation will result in readjustment even though corresponding wear is not present. After the brake has cooled down, the clearance is therefore correspondingly reduced and a situation is not excluded in which the lining sticks to the brake drum, or the drum brake undesirably becomes wedged, i.e. unable to be released. In order to avoid this, the original clearance is accordingly chosen to be larger, although this means longer actuating travels. In order, despite all this, to obtain a rapidly acting brake, the motor that drives the spreader unit has to respond quickly enough and the spreader unit must not have too much internal friction. This increases the structural complexity and the energy requirement for braking.

Therefore, a spreader unit which ensures that sticking/wedging between the friction linings and brake drum does not occur when the brake drum has undergone temperature-dependent expansion at the start of braking is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A thermally activatable blocking device is provided, which is designed such that, at a temperature above a setpoint value, the execution of a readjustment step by the readjustment device is mechanically prevented.

This has the result, in an automatic manner without current, that, at a detected brake temperature above a predetermined, defined setpoint temperature value, for the purpose of compensation, no readjustment step at all or a reduced readjustment step is carried out in order that excessive readjustment is prevented. Otherwise, the readjusted actuating travel of the spreader unit would, on account of the temperature-dependent expansion of the brake, take on that dimension that is linked with a high level of wear on the brake linings in the case of a cold brake. Since the readjustment step is prevented or adapted, after braking associated with an increased temperature of the brake, and after cooling of the brake, the originally designed (uninfluenced) clearance is reestablished. Wear-related readjustment thus takes place only when the temperature of the brake during brake actuation/braking has not been increased to above the setpoint temperature value.

The readjustment device may have a freewheel clutch consisting of two claws and working in an incremental manner, wherein, during freewheeling, the claws carry out a relative stroke and wherein one claw is connected to the first brake shoe holder in a manner secured against rotation and the other claw is connected to the second actuating piston via a threaded spindle.

Upon actuation of the brake, the first brake shoe holder rotates with respect to the second actuating piston in the freewheeling direction of the claw clutch. As long as the rotation angle remains below a predetermined step width, the freewheel clutch rotates back into its original position when the brake is released. If the step width is exceeded during braking, however, the freewheel clutch remains in the angular position that has been reached when the brake is released, with the result that the second actuating piston is permanently offset axially with respect to the first actuating piston by means of the threaded spindle, wherein the offset compensates for the wear on the brake lining that has been reached thus far.

During freewheeling, the claws move away from one another, i.e. carry out a relative stroke. This can be used to allow the freewheel clutch to pass into its starting position even when the step width is exceeded. To this end, the blocking device is arranged operatively parallel to the claw clutch and keeps the claws apart in the activated state.

The claws may have, on a respective one of their end faces, sawtooth ramps that extend in a circle and engage in one another, wherein the length of a ramp on the circular arc defines the predetermined step width and the height of the ramp defines a maximum claw stroke. Each ramp forms a notch such that the claw clutch jumps into the next notch when the step width has been reached.

The sawtooth ramps have the effect that the mutual rotation of the claws in a circumferential direction is blocked and an axially directed force is exerted in the opposite circumferential direction. If, in the latter case, the two claws are rotated with respect to one another, the ramps slide over one another such that the claws are moved apart. As soon as the actuating travel of the spreader unit becomes too large on account of wear, the rotation of the claws becomes greater than the step width and so the claws jump into the next notch. When the brake is released, the claw connected to the first brake shoe holder will carry along the other claw, such that their rotation is converted by the spindle connection into a movement in translation of the second actuating piston. As a result, the two actuating pistons are spaced further apart from one another such that the original clearance is reestablished.

In the event of significant heating of the brake during the braking operation, the actuating travel will likewise increase in size, but this should not result in readjustment. Therefore, the blocking device prevents the claw from engaging in the next notch, with the result that it drops back into the original notch when the brake is released. There is therefore no readjustment. This is not desired either, since the increased actuating travel has not been caused by abrasion of the linings but by temperature-dependent expansion of the brake drum.

The blocking device may be represented by a bimetallic element, wherein there is a blocking space between the claws, said blocking space being laterally delimited by the claws, and wherein the bimetallic element is arranged such that it is capable of expanding into or in the blocking space at least when the maximum claw stroke has been reached.

At the latest when the claws, on account of an increased actuating travel, have rotated and in the process moved apart to such an extent that the claws would jump into the next notch, the bimetallic element slides into the blocking space or expands in the blocking space and prevents this, because the claws bear on the bimetallic element on both sides rather than dropping back into a notch.

One embodiment of the bimetallic element may consist of a spiral spring, the diameter of which changes depending on temperature and which is arranged such that its outer edge passes into the blocking space upon temperature-dependent expansion. This spiral spring is arranged between the two claws coaxially with the axis of the spreader unit. Upon heating of the brake, the spiral spring expands such that its outer edge passes into said blocking space.

Another possibility is that the bimetallic element has at least one arm extending from a center, which lengthens depending on temperature and which is arranged such that its distal end passes into the blocking space upon temperature-dependent lengthening of the arm.

In order to ensure uniform spacing of the claws on the circumference, it is of course also possible for a plurality of arms to be arranged in a star shape.

A further embodiment of the bimetallic element comprises two disk springs which are arranged in opposite directions, one respective side face of which assumes a convex or concave shape depending on temperature and the outer edges of which are located in the blocking space.

In the cold state, the disk springs are arranged such that their facing faces are embodied in a concave manner, such that their outer edges are located close together and do not fill the width of the blocking space in the case of an unactuated brake. If a particular setpoint temperature is reached, the disk springs flap over such that the mutually facing faces are convex. The outer edges are then capable of bearing on the two claws and keeping them at least at a spacing that is greater than the claw stroke.

If necessary, a plurality of disk spring pairs can be arranged in succession, and are also kept spaced apart by spacer rings.

The rotation-translation converter assembly can be present configured in a manner combined in various ways. For the purpose of electromechanical actuation, the spreader apparatus cooperates with an electromotive actuator, which may be configured as an independently handleable or mountable motor-transmission unit. A spreader unit configured may have, in an electric drum brake system, for the purpose of cooperation or interaction, i.e. closed-loop or open-loop control of the actuator system, an electronic control unit with an electric load measurement device, wherein the load measurement device may be present in principle in a manner integrated at any desired location.

Accordingly, this makes it possible to provide an electromechanical motor vehicle drum brake system that is controllable by open-loop or closed-loop control in a wheel-specific manner and comprises at least two drum brakes on a common vehicle axle, said drum brakes being configured as service brake system components and accordingly being able to be under closed-loop control and for example under remote control. It is possible to position the drum brake/spreader device equipped in a manner indirectly or directly attached or integrated, i.e. in the broadest sense close to the drive train, in a manner flanking the transmission.

The claw clutch may be embodied such that the claw connected to the first brake shoe holder is in the form of a latching sleeve which is firmly connected to the first brake shoe holder, and such that the claw coupled to the second actuating piston is in the form of a readjustment piston, wherein the latching sleeve is secured against rotation with respect to the second brake shoe holder, is axially movable to a limited extent with respect to the second actuating piston, and is arranged in a manner elastically preloaded against the readjustment piston.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Because the fundamental manner of operation both of a drum brake and of a rotation-translation converter device (for example a ball-ramp device) are sufficiently well known they will not be discussed in further detail below.

Figure 1:
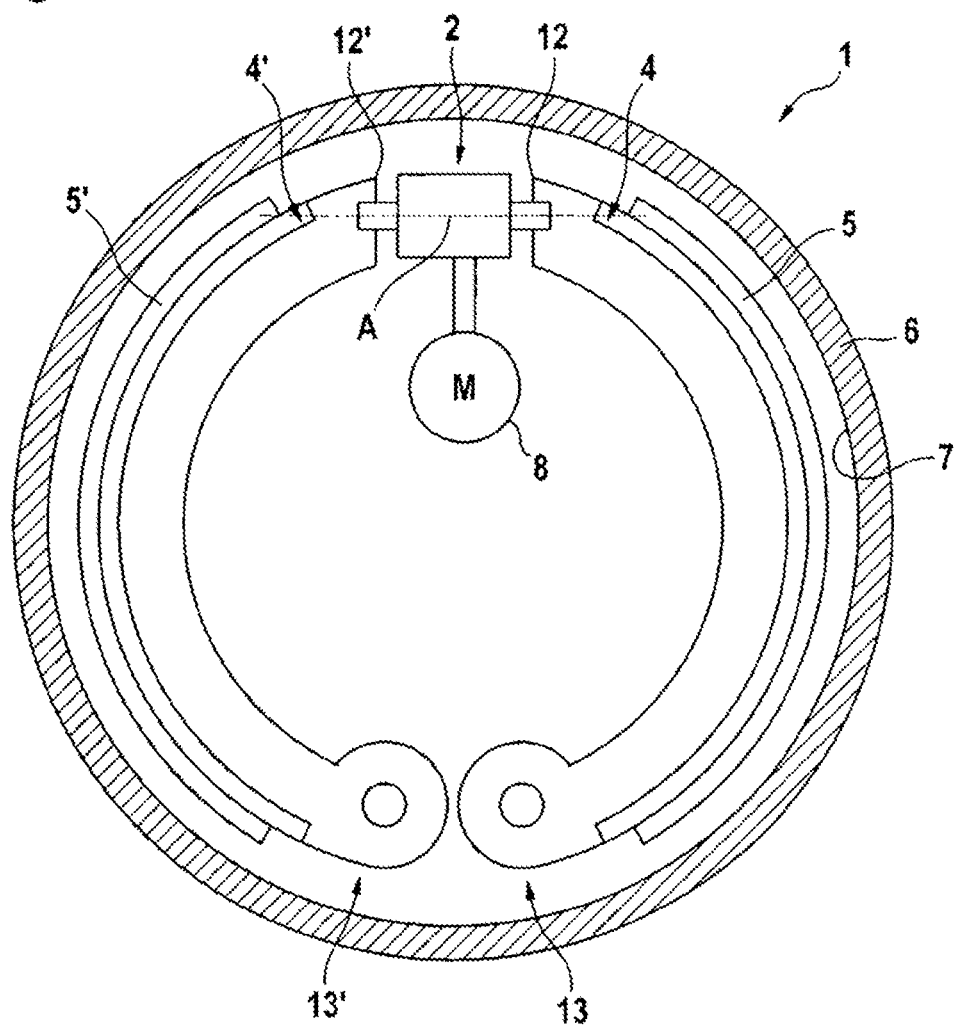
FIG. 1 shows a highly simplified sectional view of a drum brake of simplex design with a spreader unit.

FIG. 1 shows, by way of example and in a highly simplified form, a generic drum brake 1 of simplex design. Other known designs of drum brake are likewise adaptable however. Two substantially circular-arc-shaped brake shoes 4, 4', which are each supported in a rotatable manner at their first end 13, 13', are each spread apart at their second end 12, 12' by a spreader unit 2 and, in the process, are pressed against the radially inner wall 7 of a pot-shaped brake drum 6. The brake drum 6 is connected to a vehicle wheel (not shown) and rotates together with the latter with respect to the brake shoes 4, 4'. In the process, the brake linings 5, 5' attached to the brake shoes 4, 4' rub against the inner wall 7. Due to the wear on the brake linings 5, 5', the spreading travel required for a braking process increases continuously up to a defined wear limit. In order to compensate for any asymmetric, nonuniform contact between the linings 5, 5' and the brake drum 6, the spreader unit 2 is arranged in the drum brake in such a way as to be mounted to float, preferably along the central axis A thereof.

Figure 2:
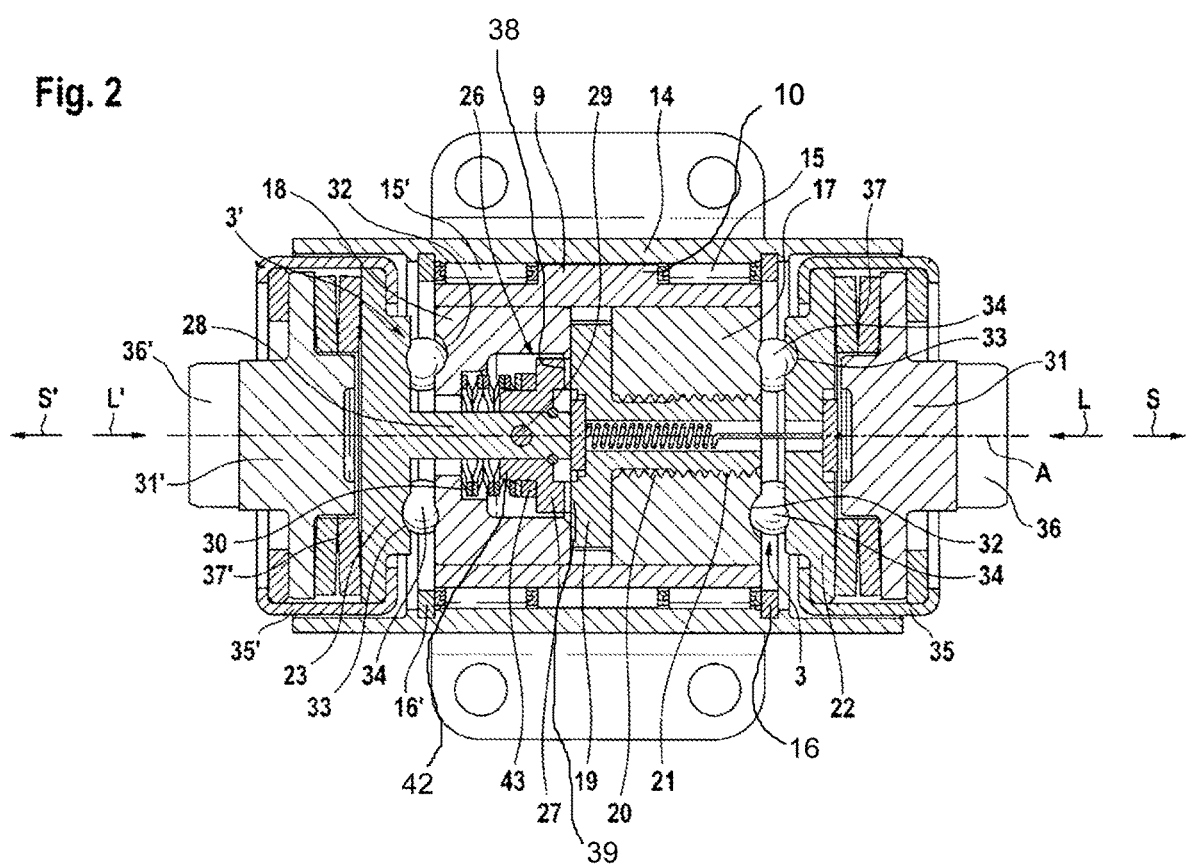
FIG. 2 shows an embodiment of the spreader unit in axial section as yet without a blocking device.

FIG. 2 shows an embodiment of the spreader unit 2 in an unactuated initial state in axial section. The spreader unit 2 has two ball-ramp devices 3, 3', which act on the brake shoes 4, 4' via brake shoe holders 31, 31'. For this purpose, each brake shoe holder 31, 31' has a transverse slot 36, 36', in each of which a flat end 12, 12' of a brake shoe 4, 4' is arranged. The spreader unit 2 also has a substantially tubular housing 14 equipped with a mounting flange. The spreader unit 2 is driven by an electric-motor drive unit 8, indicated in FIG. 1, via the external toothing 10 of a driving sleeve 9, which, as a result, is rotated about the axis A and is supported in the housing 14 via rolling bearings 15, 15' and is fixed axially by securing elements 16, 16'. Because the drum brake 1 according to the invention is provided as a service brake, all the braking processes and not just a static, constant application of force during parking, for instance, are initiated via the driving sleeve 9.

In the embodiment shown, the rolling bearings 15, 15' are in the form of needle bearings, but other types of rolling bearing are likewise permissible within the invention. The braking process is performed via the ball-ramp apparatuses 3, 3' on the brake shoe holders 31, 31' and the brake shoes 4, 4' in engagement therewith.

Each ball-ramp device 3, 3' mainly comprises a spreader piston 22, 23, an actuating piston 17, 18 that is rotatable about the axis A with respect to the spreader piston 22, 23, and a multiplicity of balls 34. At their respectively facing end faces, the first actuating piston 17 and the first spreader piston 22, and the second actuating piston 18 and the second spreader piston 23, respectively, each have an identical number of depressions 32, 33 on the same circumferential circle, said depressions 32, 33 being arranged in a manner distributed regularly in the circumferential direction. The depressions 32 in the actuating pistons 17, 18 are each formed—in a manner flattening out gradually—in a first circumferential direction, and the depressions 33 in the spreader pistons 22, 23 correspond to the depressions 32 but are flattened out in a second, opposite circumferential direction. A ball 34 is arranged between each depression 32 and 33. As a result of the rotation of the actuating pistons 17, 18 with respect to the spreader piston 22, 23 in an actuating direction, the balls 34 roll into the flattened-out regions of the depressions 32, 33 and push the piston pairs apart (and vice versa).

The two spreader pistons 22, 23 are secured against rotation in relation to the housing 14 and are thus movable only linearly along the axis A. In the embodiment shown, the security against rotation is ensured by the support of the respective brake shoe holder 31, 31' on the brake shoe 4, 4' via the transverse slot 36, 36'. In this case, each brake shoe holder 31, 31' is connected in a manner secured against rotation to the respective associated spreader piston 22, 23 via an outer sleeve 35, 35' bent inward at the edges. In this case, each spreader piston 22, 23 is arranged in a manner spaced apart axially from the associated brake shoe holder 31, 31' within the outer sleeve 35, 35', with in each case a spring element 37, 37' preloaded in between. As a result, a limited linear movement in the axial direction is made possible and this ensures that, as the drum shrinks, the increase in clamping force is limited by the compression of the spring element 37 in order to rule out damage to the brake.

The transmission of the rotary movement required for the ball-ramp apparatuses 3, 3' is performed via a first actuating piston 17 and a second actuating piston 18. For the purpose of uniform contact between the brake linings 5, 5' and the inner wall 7, the two actuating pistons 17, 18 are arranged in the driving sleeve 9 in an axially floating manner and in a manner secured against rotation by means of axial guide.

A readjustment device 26 mainly comprises a readjustment piston 19, which is in the same force transmission path as the first actuating piston 17, and a latching sleeve 27, which is in engagement with the readjustment piston 19 and is arranged in a manner secured against rotation with respect to the second spreader piston 28 but in a manner which allows axial movement to a limited extent and under elastic preload against the readjustment piston.

A separate readjustment piston 19 is screwed into a threaded hole 20 in the first actuating piston 17 as far as a stop position by means of a threaded portion 21 and thus lies in the force transmission path between the first actuating piston 17 and the second actuating piston 18. At its end face facing the second actuating piston 18, the readjustment piston 19 has an axially projecting annular first sawtooth ramp 38 having a plurality of tooth-shaped ramps or notches inclined in one circumferential direction.

The latching sleeve 27 is arranged in a manner substantially integrated into the second actuating piston 18. It has an axially projecting annular second sawtooth ramp 39, which corresponds to the first sawtooth ramp 38 and which likewise consists of a plurality of tooth-shaped ramps or notches inclined in an opposite circumferential direction.

The latching sleeve 27 is mounted via a central hole on a stem 28 of the second spreader piston 23 in a manner which allows axial movement and in a manner secured against rotation with respect to the housing 14. In the embodiment shown, a transverse pin 29 is provided in the stem 28 to prevent rotation, the latching sleeve 27 being supported on said pin 29 in both circumferential directions via an axially projecting slotted collar 42.

The latching sleeve 27 is pressed permanently with a slight force onto the sawtooth ramp 38 of the readjustment piston 19 by a compression spring 30 supported on the second actuating piston 18. A sliding disk 43 reduces the friction and the rotation of the compression spring 30 when the second actuating piston 18 is rotated.

In the embodiment shown, the compression spring 30 is in the form of a wave spring. Further embodiments, for example a spiral spring or a disk spring assembly, are likewise permissible within the invention.

When the two actuating pistons 17 and 18 are driven by the driving sleeve 9, the readjustment piston 19 is rotated relative to the latching sleeve 27, which is immovable in the circumferential direction. In the process, the ramps of the readjustment piston 19 run up onto the ramps of the latching sleeve 27 during each actuation or braking operation and push them slightly into the second actuating piston 18, counter to the spring action of the compression spring 30. With increasing wear on the brake linings 5, 5', the required stroke and thus the angle of rotation of the driving sleeve 9 and of the readjustment piston 19 coupled thereto increases. As soon as the angle exceeds the circumferential length of a ramp of the sawtooth ramps 38, 39, the axial toothing between the latching sleeve 27 and the readjustment piston 19 jumps into the next notch. If the brake is then released after a braking operation, the first actuating piston 17 rotates back into the unactuated initial position together with the driving sleeve 9. However, the readjustment piston 19 is hindered from rotating back by the rotationally secured latching sleeve 27 and, as a result, is unscrewed from the first actuating piston 17 by the corresponding amount. Thus, when the drum brake 1 is released, the brake is readjusted incrementally in a fully automatically travel-controlled manner.

In the following text, embodiments of the blocking device which is used with the spreader unit according to FIG. 2 are described.

Figure 3A:
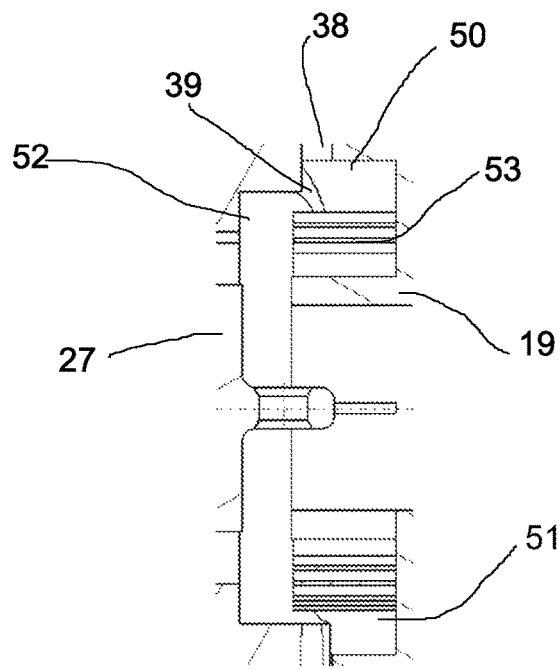
FIGS. 3a, b, c show an enlarged illustration of the spreader unit with a first embodiment of the blocking device according to the invention with a bimetallic spiral spring in various stages of brake actuation.

FIGS. 3*a, b* show, in this regard, a detail of the region of the claw clutch, consisting of the latching sleeve and the readjustment piston 19. A blocking space 50 is located in between. To this end, an annular depression 51 is located in the end face of the readjustment piston 19 and a circular depression 52 that is coaxial therewith is located in the latching sleeve 27. In this case, the outside diameter of the annular depression 51 is greater than that of the circular depression 52. The sawtooth ramps 38, 39 follow radially on the outside of the depressions. The bottoms of the depressions 51, 52 are parallel to one another and opposite one another. The blocking space 50 is delimited on one side by the bottom of the annular depression 51 and on the other side by the opposite sawtooth ramp 39 on the latching sleeve 27.

A spiral spring 53 made of a bimetal is located within the annular depression 51. The depth of the annular depression corresponds to the width of the spiral spring 53. One side of the spiral spring 53 lies on the bottom of the annular depression 51 such that its other side reaches as far as the tips of the sawtooth ramp 39 on the latching sleeve 27. In this case, the spiral spring 53 can be fastened to a central peg in the annular depression 51.

Figure 3B:
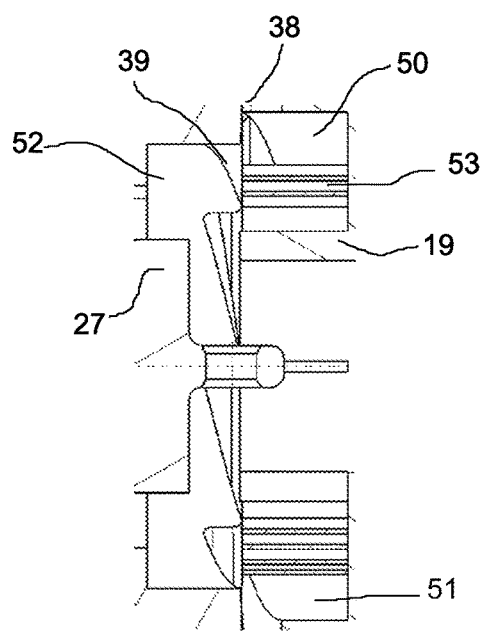

FIG. 3*a* shows an unactuated brake in the cold state. The two sawtooth ramps 38, 39 engage in one another such that the spiral spring 53 projects into the circular depression 52. This is possible since its diameter in the cold state is smaller than the diameter of the circular depression 52. As long as the brake does not heat up excessively during a braking operation, the diameter of the spiral spring 53 remains smaller than the diameter of the circular depression 52 such that, as shown in FIG. 3*b*, it does not fill the annular depression 51 as far as the outside diameter thereof, although the two sawtooth ramps 38, 39 are not in engagement and drop back into the next latching step upon further rotation in order that a wear-related correction of the clearance can subsequently take place, as is described in connection with FIG. 2.

Figure 3C:
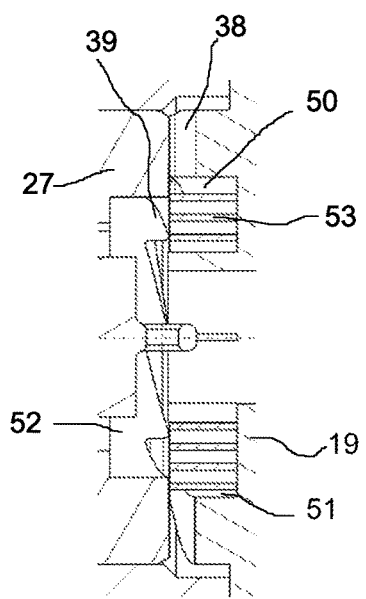

The situation in which the brake heats up significantly is different. This is illustrated in FIG. 3*c*. When the two sawtooth ramps 38, 39 are not in engagement, i.e. have carried out the maximum claw stroke, the annular spring expands into the blocking space 50 between the sawtooth ramp 39 on the latching sleeve 27 and the edge of the bottom of the annular depression 51. Thus, even when they have rotated through a step width with respect to one another, the sawtooth ramps 38, 39 cannot pass into engagement in a new latching step. Rather, when the brake is released, the sawtooth ramps 38, 39 will initially take up their old angular position again and come into engagement there again later when the spiral spring 53 has cooled down and contracted again.

Since, however, not every braking operation is associated with increased development of heat, during one of the subsequent braking operations, readjustment will not be impeded, such that the lining wear that has accrued thus far can be compensated.

Figures 4A, 4B:
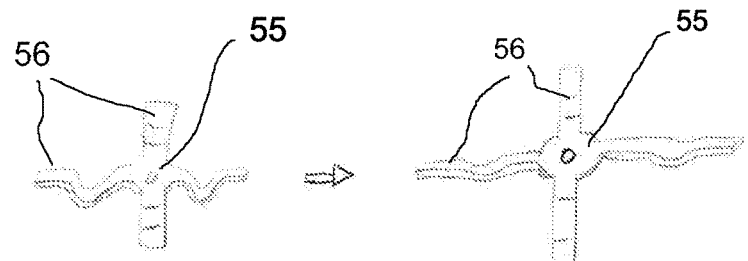
FIGS. 4a, b show a star-shaped bimetallic element as a second embodiment of the blocking.

Instead of a spiral spring, it is also possible to use a star-shaped element according to FIGS. 4*a, b*, which has a center 55 from which, for example, four arms 56 exhibiting bimetal extend. In the cold state, the arms 56 are shortened (FIG. 4*a*) and in the heated state they are stretched (FIG. 4*b*) such that their distal ends are located between the latching sleeve 27 and the readjustment piston in the blocking space 50 such that the sawtooth ramps 38, 39 cannot take up a rotated latching position.

Figure 5A:
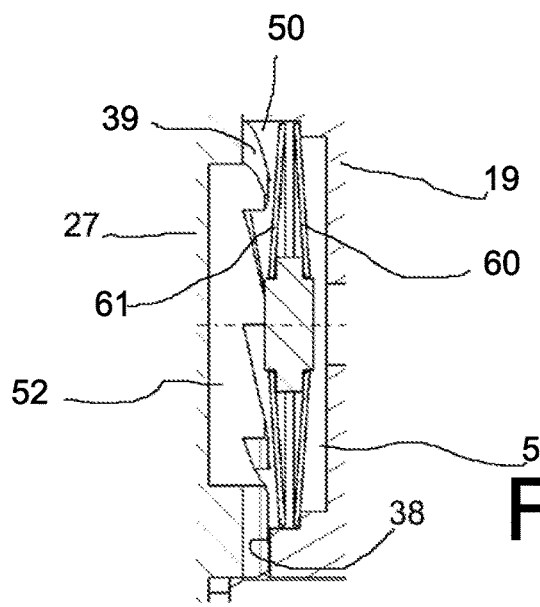
FIGS. 5a, b show a bimetallic element consisting of two disk springs as a third embodiment of the blocking device.
Figure 5B:
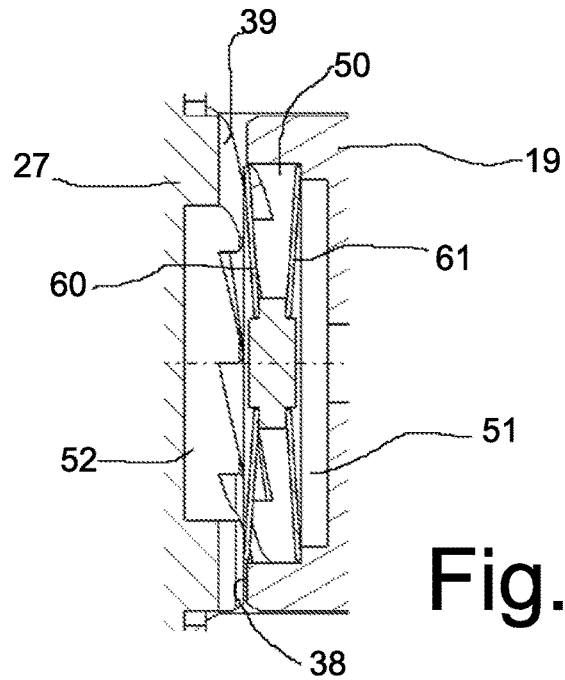

FIG. 5*a* shows an embodiment of the bimetallic element in the form of two coaxially arranged disk springs 60, 61 made of bimetal, which are arranged in a coaxial manner such that their mutually facing faces are concave in the cold state. Their edges in the blocking space 50 are thus located close together and cannot fill the width of the blocking space 50. When the brake heats up (FIG. 5*b*), the disk springs flap over such that their concave sides are now located on the outside and their edges are spaced apart. As a result, they fill the width of the blocking space 50 and so the sawtooth ramps 38, 39 cannot take up a rotated latching position, thereby preventing readjustment.

Figure 6:
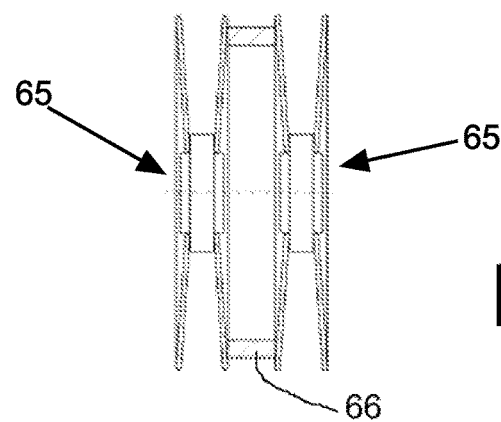
FIG. 6 shows a bimetallic element consisting of two disk spring pairs as a fourth embodiment of the blocking device.

In order to achieve a sufficiently great difference between the edge width in the cold state and in the heated state even in the case of small flapping angles of the disk springs 60, 61, it is possible—as shown in FIG. 6—for two (or more) disk spring pairs 65 to be placed in succession, wherein a spacer ring 66 is located in each case in between.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:
1. A spreader unit for a drum brake, comprising:
   a housing;
   a first and second brake shoe holders that are rotationally secured to the housing, and actuatable linearly along an axis, respectively away from one another in a spreading direction and respectively toward one another in a release direction;
   a first and a second brake shoe provided respectively with a brake lining;

a readjustment device arranged between the actuating pistons, wherein the readjustment device changes the spacing of the actuating pistons in at least one readjustment step when an actuating travel of the first and second brake shoe holders has exceeded a travel setpoint value;

a thermally actuable blocking device mechanically prevents the execution of the readjustment step by the readjustment device at a temperature above a temperature setpoint value;

an electromechanical actuator comprising an electric motor to drive the spreader unit; and an electric load measurement device acting one of directly and indirectly on the spreader unit.

2. The spreader unit as claimed in claim 1, wherein the readjustment device further comprises a freewheel clutch having two claws, wherein the claws carry out a relative stroke during freewheeling and wherein one claw is rotationally secured to the first brake shoe holder and the other claw is connected to the second actuating piston via a threaded spindle, and wherein the blocking device is arranged operatively parallel to the clutch to keep the claws apart in the activated state.

3. The spreader unit as claimed in claim 2, wherein the claws have, on a respective one of their end faces, sawtooth ramps that extend in a circle and engage in one another, wherein the length of a ramp on the circular arc defines the predetermined step width and the height of the ramp defines a maximum claw stroke.

4. The spreader unit as claimed in claim 2, wherein the claw connected to the first brake shoe holder is a latching sleeve which is firmly connected to the first brake shoe holder, and the other claw coupled to the second actuating piston is a readjustment piston, wherein the latching sleeve is rotationally secured with respect to the second brake shoe holder, is axially movable with respect to the second actuating piston, and is elastically preloaded against the readjustment piston.

5. A spreader unit for a drum brake, comprising:
a housing;
a first and second brake shoe holders that are rotationally secured to the housing, and actuatable linearly along an axis, respectively away from one another in a spreading direction and respectively toward one another in a release direction;
a first and a second brake shoe provided respectively with a brake lining;
a readjustment device arranged between the actuating pistons, wherein the readjustment device changes the spacing of the actuating pistons in at least one readjustment step when an actuating travel of the first and second brake shoe holders has exceeded a travel setpoint value; and
a thermally actuable blocking device mechanically prevents the execution of the readjustment step by the readjustment device at a temperature above a temperature setpoint value;
wherein the readjustment device further comprises a freewheel clutch having two claws, wherein the claws carry out a relative stroke during freewheeling and wherein one claw is rotationally secured to the first brake shoe holder and the other claw is connected to the second actuating piston via a threaded spindle, and wherein the blocking device is arranged operatively parallel to the clutch to keep the claws apart in the activated state;
wherein the blocking device has a bimetallic element, and a blocking space is located between and is laterally delimited by the claws, wherein at least a portion of the bimetallic element passes into the blocking space at least when the maximum claw stroke has been reached.

6. The spreader unit as claimed in claim 5, wherein the bimetallic element has a spiral spring, the diameter of which changes depending on temperature and wherein an outer edge of the spiral spring passes into the blocking space upon temperature-dependent expansion.

7. The spreader unit as claimed in claim 5, wherein the bimetallic element has at least one arm extending from a center, which lengthens depending on temperature and wherein a distal end passes into the blocking space upon temperature-dependent lengthening of the arm.

8. The spreader unit as claimed in claim 7, wherein the bimetallic element has a plurality of arms.

9. The spreader unit as claimed in claim 8, wherein the plurality of arms are arranged in a star shape.

10. The spreader unit as claimed in claim 5, wherein the bimetallic element has two disk springs which are arranged in opposite directions, one respective side face of which assumes a convex or concave shape depending on temperature and at least the outer edges of which are located in the blocking space.

11. The spreader unit as claimed in claim 10, wherein at least two pairs of disks are provided.

12. The spreader unit as claimed in claim 11, wherein a spacer ring is located between the pairs of disks.

13. A spreader unit for a drum brake comprising:
a housing;
a first and second brake shoe holders that are rotationally secured to the housing, and actuatable linearly along an axis, respectively away from one another in a spreading direction and respectively toward one another in a release direction;
a first and a second brake shoe provided respectively with a brake lining, having at least one rotation-translation converter mechanism;
a readjustment device arranged between the actuating pistons, wherein the readjustment device changes the spacing of the actuating pistons in at least one readjustment step when an actuating travel of the first and second brake shoe holders has exceeded a travel setpoint value; and
a thermally actuable blocking device which mechanically prevents the execution of the readjustment step by the readjustment device at a temperature above a temperature setpoint value;
wherein the spreader is electromechanically drivable with the aid of an electromechanical actuator comprising an electric motor; and
wherein the spreader is equipped indirectly or directly with an electric load measurement device.

14. The speader unit of claim 13, wherein the at least one rotation-translation converter mechanism is at least one of:
a ball-ramp apparatuses, wherein a first ball-ramp apparatus has a first actuating piston that is arranged so as to be rotatable about an axis and optionally a second ball-ramp apparatus has a second actuating piston that is arranged so as to be rotatable about an axis;
at least one nut-spindle transmission; and
a mixed configuration having features of the ball-ramp apparatuses and the at least one nut-spindle transmission.

15. The speader unit of claim 13, wherein the electric load measurement devices cooperates with the load measurement device for the purpose of applying the drum brake under electrical open-loop and/or closed-loop control.

16. The speader unit of claim 13, wherein the at least one nut-spindle transmission has inserted rolling bodies.

* * * * *